United States Patent
Yun

(10) Patent No.: US 9,453,732 B2
(45) Date of Patent: Sep. 27, 2016

(54) REMOTE CONTROL FOR SENSING MOVEMENT, IMAGE DISPLAY APPARATUS FOR CONTROLLING POINTER BY THE REMOTE CONTROL, AND CONTROLLING METHOD THEREOF

(71) Applicant: SAMSUNG ELECTRONICS CO., LTD., Gyeonggi-do (KR)

(72) Inventor: Hyun-kyu Yun, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 13/780,078

(22) Filed: Feb. 28, 2013

(65) Prior Publication Data

US 2013/0181899 A1 Jul. 18, 2013

Related U.S. Application Data

(63) Continuation of application No. 12/048,761, filed on Mar. 14, 2008, now Pat. No. 8,462,011.

(30) Foreign Application Priority Data

Sep. 19, 2007 (KR) .......................... 10-2007-0095535

(51) Int. Cl.
*G06F 3/033* (2013.01)
*G01C 19/00* (2013.01)
(Continued)

(52) U.S. Cl.
CPC ............. *G01C 19/00* (2013.01); *G06F 1/3203* (2013.01); *G06F 1/3259* (2013.01); *G06F 3/038* (2013.01);

(Continued)

(58) Field of Classification Search
CPC .... G06F 3/038; G06F 3/0346; G06F 1/3259; G08C 2201/32; H04N 2005/4432; H04N 5/4403; H04N 5/44582; H04N 21/42224; A63F 13/10; A63F 2300/105
USPC ....... 340/12.22, 4.11, 825.22, 825.69, 572.1, 340/3.1, 12.23; 455/151, 352, 414.4; 715/856, 863; 345/156–184, 419
See application file for complete search history.

(56) References Cited

U.S. PATENT DOCUMENTS 6,081,255 A * 6/2000 Narabu ................. G06F 3/0325
345/157
7,239,301 B2 7/2007 Liberty et al.
(Continued)

FOREIGN PATENT DOCUMENTS

JP 2003-333360 A 11/2003
JP 2005-12433 A 1/2005
(Continued)

OTHER PUBLICATIONS

Communication dated Dec. 28, 2011, issued by the Korean Intellectual Property Office in counterpart Korean Application No. 10-2007-0095535.
(Continued)

*Primary Examiner* — Mirza Alam
(74) *Attorney, Agent, or Firm* — Sughrue Mion, PLLC

(57) ABSTRACT

A remote control is provided including a plurality of sensors which sense movement of the remote control, and a control unit which turns on at least one sensor of the plurality of sensors and thereby senses movement of the remote control, and determines whether to turn on or off the remaining sensors according to whether or not the at least one sensor senses movement of the remote control. Consequently, battery consumption is reduced.

20 Claims, 5 Drawing Sheets

(51) Int. Cl.
G06F 1/32 (2006.01)
G06F 3/0346 (2013.01)
G06F 3/038 (2013.01)
H04N 5/44 (2011.01)
H04N 21/422 (2011.01)

(52) U.S. Cl.
CPC .......... G06F 3/0346 (2013.01); G06F 3/0383 (2013.01); H04N 5/4403 (2013.01); H04N 21/42222 (2013.01); *G08C 2201/32* (2013.01); *H04N 2005/4428* (2013.01); *H04N 2005/4432* (2013.01); *Y02B 60/1253* (2013.01)

(56) References Cited

U.S. PATENT DOCUMENTS

| | | | | |
|---|---|---|---|---|
| 7,301,529 | B2* | 11/2007 | Marvit | G06F 1/1626 345/156 |
| 7,408,506 | B2* | 8/2008 | Miller | 342/357.77 |
| 7,489,298 | B2 | 2/2009 | Liberty et al. | |
| 7,614,080 | B2* | 11/2009 | Milligan et al. | 726/14 |
| 7,737,965 | B2 | 6/2010 | Alter et al. | |
| 2001/0049249 | A1* | 12/2001 | Tachau | A63H 17/34 446/397 |
| 2002/0082026 | A1* | 6/2002 | Narayanan | 455/456 |
| 2003/0142065 | A1 | 7/2003 | Pahlavan | |
| 2005/0212767 | A1 | 9/2005 | Marvit et al. | |
| 2005/0225453 | A1* | 10/2005 | Chang et al. | 340/825.69 |
| 2005/0253806 | A1 | 11/2005 | Liberty et al. | |
| 2006/0150215 | A1 | 7/2006 | Wroblewski | |
| 2006/0161377 | A1* | 7/2006 | Rakkola et al. | 702/141 |
| 2007/0054651 | A1* | 3/2007 | Farmer et al. | 455/352 |
| 2007/0080940 | A1* | 4/2007 | Aoki et al. | 345/158 |
| 2007/0185968 | A1* | 8/2007 | White et al. | 709/208 |
| 2007/0265104 | A1* | 11/2007 | Haga et al. | 473/37 |
| 2008/0224026 | A1* | 9/2008 | Pasternak | 250/206 |
| 2008/0309618 | A1* | 12/2008 | Okada | A63F 13/04 345/157 |
| 2009/0293012 | A1* | 11/2009 | Alter et al. | 715/810 |
| 2009/0325557 | A1* | 12/2009 | Wada | G01C 21/20 455/414.4 |
| 2010/0001953 | A1* | 1/2010 | Yamamoto et al. | 345/158 |
| 2015/0062444 | A1* | 3/2015 | Henty | G06F 3/0304 348/734 |

FOREIGN PATENT DOCUMENTS

| | | |
|---|---|---|
| KR | 10-2004-0077349 A | 9/2004 |
| KR | 10-2005-0080264 A | 8/2005 |
| KR | 10-2007-0058348 A | 6/2007 |
| WO | 2006/073654 A2 | 7/2006 |

OTHER PUBLICATIONS

Extended European Search Report issued on May 19, 2010 in counterpart European Application No. 08162374.6.

* cited by examiner

REMOTE CONTROL FOR SENSING MOVEMENT, IMAGE DISPLAY APPARATUS FOR CONTROLLING POINTER BY THE REMOTE CONTROL, AND CONTROLLING METHOD THEREOF

CROSS-REFERENCE TO RELATED APPLICATIONS

This application is a Divisional of U.S. application Ser. No. 12/048,761, which was filed on Mar. 14, 2008, and claims priority under 35 U.S.C. §119 from Korean Patent Application No. 10-2007-0095535, filed on Sep. 19, 2007, in the Korean Intellectual Property Office, the disclosures of which is incorporated herein by reference in its entirety.

BACKGROUND OF THE INVENTION

1. Field of the Invention

Apparatuses and methods consistent with the present invention relate to providing a remote control for sensing its movement, an image display apparatus for controlling a pointer using the remote control, and a controlling method thereof, and more particularly, to providing a remote control which determines whether to turn on/off other sensors using one of a plurality of sensors mounted in the remote control, and transmits a signal output from the sensor to an image display apparatus without applying the signal to an algorithm, and the image display apparatus which determines the position of a pointer using the signal transmitted from the remote control, and a controlling method thereof.

2. Description of the Related Art

Digital televisions output diverse broadcast signals, such as text and data, in addition to images, on displays, and have various functions absent from conventional televisions, and various options to display broadcast signals in an optimal way. Accordingly, digital televisions provide users with a graphical user interface (GUI) environment, for example, an on-screen display (OSD), so that the users can change settings of the digital television.

In general, the user changes settings using a remote control. The user presses buttons provided on the remote control in order for the setting information of the image display apparatus to be displayed.

However, it is inconvenient for the user to press buttons one by one to display the setting information. In addition, such inconvenience increases when there are many buttons provided on the remote control. Accordingly, users prefer more convenient manipulation when using the GUI, so recently a method for controlling the image display apparatus using a remote control adopting a remote pointing operation has been developed.

The remote pointing operation consists of a pointer being displayed on the image display apparatus and moving in association with the movement of the remote control, so the user can easily select menus displayed on the image display apparatus.

A remote control adopting the remote pointing operation needs to include a plurality of sensors for sensing movement of the remote control, and a calculation unit for calculating motion vectors for signals output from the sensors.

However, such a remote control adopting the remote pointing operation has the shortcoming of increased battery consumption over general remote controls. Moreover, the plurality of sensors need to remain turned on, leading to high battery consumption. As a result, user convenience is reduced.

Therefore, there is a need for a remote control system in which battery consumption is reduced.

SUMMARY OF THE INVENTION

Exemplary embodiments of the present invention address at least the above problems and/or disadvantages and other disadvantages not described above. Also, the present invention is not required to overcome the disadvantages described above, and an exemplary embodiment of the present invention may not overcome any of the problems described above.

The present invention provides a remote control which determines whether to turn on/off a plurality of sensors mounted in the remote control using one of the sensors, and transmits a signal output from the sensor to an image display apparatus without applying the signal to an algorithm so that battery consumption is reduced, and the image display apparatus which determines the position of a pointer using the signal transmitted from the remote control, and a controlling method thereof.

According to an exemplary aspect of the present invention, there is provided a remote control including a plurality of sensors which sense movement of the remote control, and a control unit which turns on at least one sensor of the plurality of sensors and thereby senses movement of the remote control, and determines whether to turn on or off the remaining sensors according to whether or not the at least one sensor senses movement of the remote control.

The control unit may turn on the remaining sensors if a signal level output from the at least one sensor is higher than a reference signal level.

The remote control may further include an analog to digital converter (ADC) which converts analog signals output from the sensors into digital signals, and a transmission unit which converts the converted digital signals into transmittable signals and transmits the transmittable signals.

The sensors may include gyro sensors, acceleration sensors, and terrestrial magnetism sensors.

According to another exemplary aspect of the present invention, there is provided an image display apparatus including a reception unit which receives a signal corresponding to movement of the remote control from the remote control, a calculation unit which calculates a motion vector of the remote control using the received signal, and a control unit which applies the calculated motion vector to coordinates of a pointer displayed on a display and thereby moves the location of the pointer.

According to another exemplary aspect of the present invention, there is provided a method for controlling a remote control including a plurality of sensors for sensing movement of the remote control in order to control an external device, the method including turning on at least one sensor of the plurality of sensors and thereby sensing movement of the remote control, and determining whether to turn on or off the remaining sensors according to whether or not the at least one sensor senses movement of the remote control.

In the determination, the remaining sensors may be turned on if a signal level output from the at least one sensor is higher than a reference signal level.

The method may further include converting analog signals output from the plurality of sensors into digital signals if the plurality of sensors are turned on, and converting the converted digital signals into transmittable signals and transmitting the transmittable signal to the external device.

The sensors may include gyro sensors, acceleration sensors, and terrestrial magnetism sensors.

According to another exemplary aspect of the present invention, there is provided a method of controlling a display using a pointer in an image display apparatus, the method including receiving a signal corresponding to movement of a remote control from the remote control, calculating a motion vector of the remote control using the received signal, and applying the calculated motion vector to coordinates of a pointer displayed on a display and thereby moving the location of the pointer.

According to another exemplary aspect of the present invention, there is provided an image display system including an image display apparatus and a remote control. The remote control may include a plurality of sensors which sense movement of the remote control, a control unit which turns on at least one sensor of the plurality of sensors and thereby senses movement of the remote control and determines whether to turn on or off the remaining sensors according to whether or not the at least one sensor senses movement of the remote control, an analog to digital converter (ADC) which converts analog signals output from the sensors into digital signals, and a transmission unit which converts the converted digital signals into transmittable signals and transmits the transmittable signals. The image display apparatus may include a display, a reception unit which receives the signals from the remote control, and a control unit which converts the received signals into displayable signals and displays the converted signals on the display.

According to another exemplary aspect of the present invention, there is provided a method of controlling an image display system including an image display apparatus and a remote control, which includes a plurality of sensors, the method including turning on at least one sensor of the plurality of sensors and thereby sensing movement of the remote control, determining whether to turn on or off the remaining sensors according to whether or not the at least one sensor senses movement of the remote control, converting analog signals output from the plurality of sensors into digital signals if the plurality of sensors are turned on, converting the converted digital signals into transmittable signals and transmitting the transmittable signals to the image display apparatus, and receiving the transmitted signals, converting the received signals into displayable signals and displaying the converted signals.

BRIEF DESCRIPTION OF THE DRAWINGS

The above and/or other aspects of the present invention will be more apparent by describing certain exemplary embodiments of the present invention with reference to the accompanying drawings, in which.

DETAILED DESCRIPTION OF EXEMPLARY EMBODIMENTS OF THE INVENTION

Figure 1:
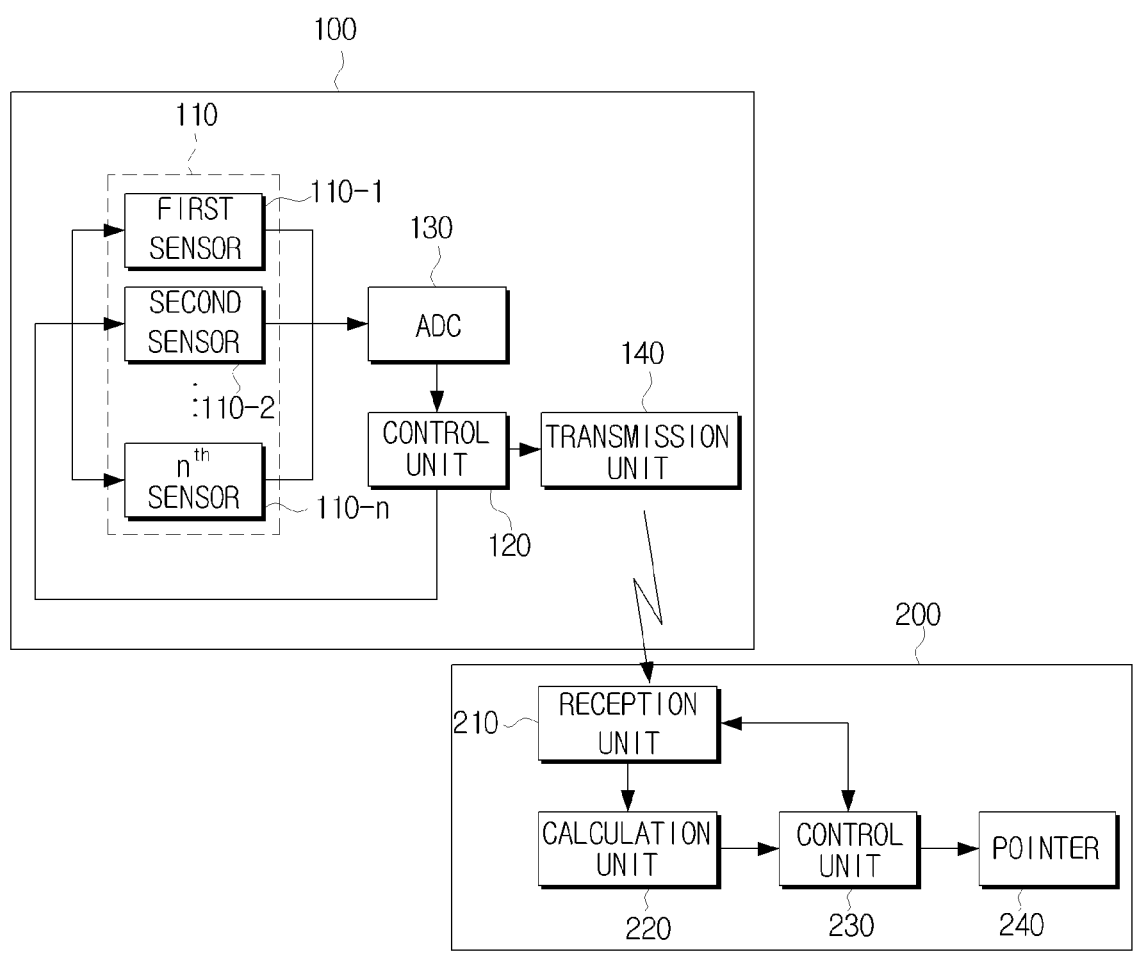
FIG. 1 is a block diagram of a remote control and an image display apparatus according to an exemplary embodiment of the present invention.

Certain exemplary embodiments of the present invention will now be described in greater detail with reference to the accompanying drawings.

In the following description, the same drawing reference numerals are used for the same elements even in different drawings. The matters defined in the description, such as detailed construction and elements, are provided to assist in a comprehensive understanding of the invention. Thus, it is apparent that the present invention can be carried out without those specifically defined matters. Also, well-known functions or constructions are not described in detail since they would obscure the invention with unnecessary detail.

FIG. 1 is a block diagram of a remote control and an image display apparatus according to an exemplary embodiment of the present invention. The remote control 100 includes a plurality of sensors 110-1 to 110-$n$, a control unit 120, an analog to digital converter (ADC) 130, and a transmission unit 140. The image display apparatus 200, which operates according to the control of the remote control 100, includes a reception unit 210, a calculation unit 220, a control unit 230, and a pointer 240. For convenience of explanation, the control unit 120 of the remote control 100 is referred to hereinbelow as the first control unit 120, and the control unit of 230 of the image display apparatus 200 is referred to hereinbelow as the second control unit 230.

The plurality of sensors 110-1 to 110-$n$ sense movement of the remote control 100. The sensors 110-1 to 110-$n$ may be implemented as two-axis or three-axis gyro sensors, two-axis or three-axis acceleration sensors, or as a combination of at least two sensors from among two-axis or three-axis gyro sensors, two-axis or three-axis acceleration sensors, and terrestrial magnetism sensors.

The first control unit 120 operates only the first sensor 110-1 from among the plurality of sensors 110-1 to 110-$n$ to receive a power supply. In more detail, the first control unit 120 transmits an impulse signal to the first sensor 110-1 at short intervals in order for the first sensor 110-1 to regularly sense movement of the remote control 100.

Figure 2:
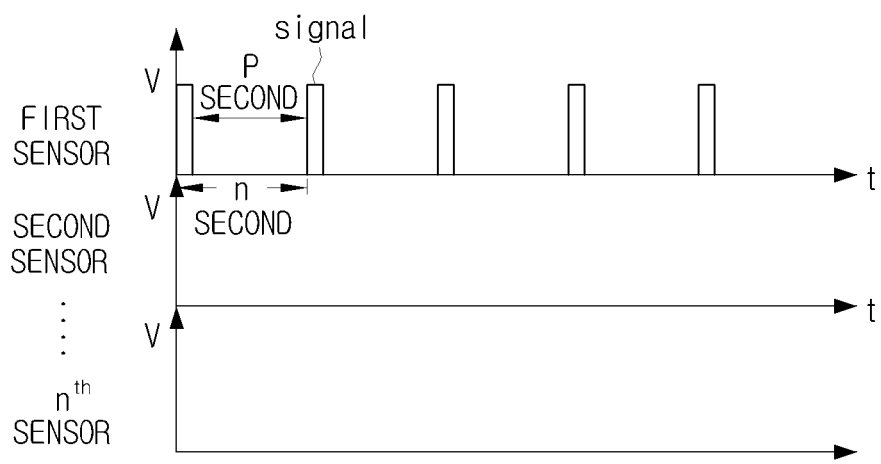
FIG. 2 is a mimetic diagram illustrating control of a sensor according to an exemplary embodiment of the present invention.

With reference to FIG. 2, the first control unit 120 generates an impulse signal for n-p seconds at n-second intervals, so that the first sensor 110-1 can regularly sense movement of the remote control 100. The second sensor 110-2 to the $n^{th}$ sensor 110-$n$ do not receive any signal. The first sensor 110-1 may be a gyro sensor.

If the first sensor 110-1 senses movement of the remote control 100, the first sensor 110-1 transmits a signal corresponding to the movement to the ADC 130.

If the ADC 130 receives signals corresponding to movement of the remote control 100 from the plurality of sensors 110-1 to 110-$n$, the ADC 130 converts the signals into digital signals which can be sensed by the first control unit 120. That is, the ADC 130 performs analog to digital conversion.

Signals output from the sensors 110-1 to 110-$n$ may be analog signals or digital signals according to the processing method of the sensors 110-1 to 110-$n$. If the sensors 110-1 to 110-$n$ output digital signals, analog to digital conversion is omitted.

Movement of the remote control 100 by the user and movement of the pointer according to movement of the remote control 100 are described with reference to FIG. 3.

Figure 3:
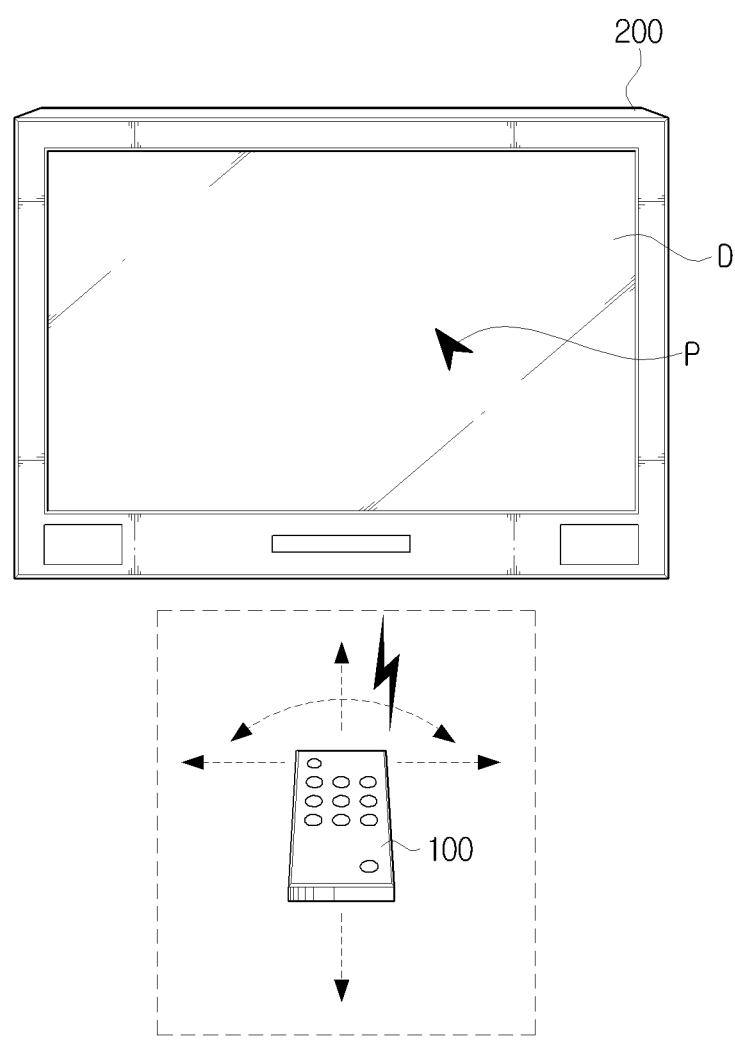
FIG. 3 is a mimetic diagram illustrating a method for controlling a pointer according to an exemplary embodiment of the present invention.

As shown with dotted arrows in FIG. 3, the user can move the front of the remote control 100 spatially. The front of the remote control 100 can move upwards, downwards, to the left, to the right, or in a direction combining two of these (for example, upwards and to the left). That is, the remote control 100 can move in any direction on a plane whereon the remote control 100 is placed.

For example, the front of the remote control 100 can form a trace on a virtual plane which is parallel to the display D of the image display apparatus.

The virtual plane and the display D may not be perfectly parallel to each other, and the virtual plane may not be perfectly flat. This is because, in reality, it is impossible for the front of the remote control 100 to move on a plane perfectly parallel to the display. In addition, if the user moves the front of the remote control 100 using his or her wrist, elbow, or finger, the front of the remote control 100 moves along a curved line. The variance of the curve and curvature vary according to the user.

Therefore, the present invention can be applied even when the front of the remote control 100 does not move perfectly parallel to the display D.

The user may move the front of the remote control 100 by holding his or her arm still while holding the remote control 100 and rotating his or her wrist.

That is, if the user rotates his or her wrist upwards, downwards, to the left, to the right, or in a direction combining two or more of these (for example, upwards and to the left), the front of the remote control 100 moves upwards, downwards, to the left, to the right, or in a direction combining two or more of these (for example, upwards and to the left) in a curved line.

If the first control unit 120 receives a digital signal of the first sensor 110-1 for the movement of the remote control 100 from the ADC 130, the first control unit 120 compares the level of the received signal with a reference signal. If the level of the received signal is higher than the reference signal, the first control unit 120 supplies power to the remaining sensors 110-2 to 110-n.

If the first control unit 120 receives no signals from any sensors during a certain time period after power is supplied to the plurality of sensors 110-1 to 110-n, the first control unit 120 supplies power only to the first sensor 110-1.

The transmission unit 140 converts the digital signal into a transmittable signal, and transmits the transmittable signal to the image display apparatus 100. The transmission unit 140 may be implemented, for example, as a radio frequency (RF) module, Zigbee, Bluetooth, or Infra-Red (IF).

When transmitting a digital signal regarding movement of the remote control 100 through the transmission unit 140, the first control unit 120 may attach a signal input using buttons on the remote control 100 and an additional signal such as channel information for high frequency transmission thereto. Signals transmitted to the image display apparatus 200 through the transmission unit 140 are referred to hereinbelow as sensor signals.

The buttons mounted on the remote control 100 include a power button, a channel button, a volume button, and a selection button.

The remote control 100 according to the present invention does not convert a signal regarding movement of the remote control 100 into a signal expressing coordinates, but converts the signal into a digital signal and transmits the digital signal, so power consumption for coordinate calculation is saved.

The image display apparatus 200 generates and provides a pointer 240 on the display (not shown). The user can control the setting menus displayed on the display of the image display apparatus 200 using the pointer 240.

The reception unit 210 receives a sensor signal corresponding to the movement of the remote control 100 from the remote control 100.

The calculation unit 220 calculates a motion vector of the remote control 100 using the received sensor signal. That is, movement variances of the remote control 100 along the X-axis and Y-axis are calculated by applying the received sensor signal to a pre-stored motion vector calculation algorithm.

The second control unit 230 moves the pointer 240 by the movement variances based on current coordinates (X, Y) of the pointer 240 in order to display the pointer 240. With reference to FIG. 3, the pointer P moves on the display D according to the spatial movement of the remote control 100. If the front of the remote control 100 moves spatially, the pointer P moves on the display D in the same direction as the front of the remote control 100 moves. The spatial movement of the front of the remote control 100 is distinct from the movement of a computer mouse moving on a surface.

Figure 4:
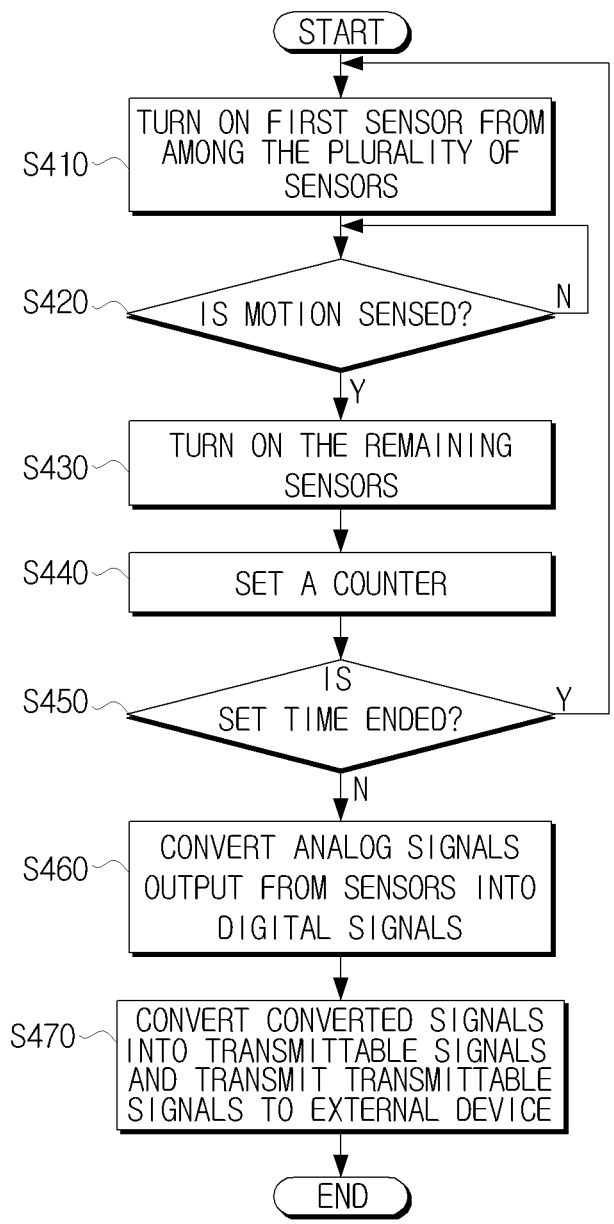
FIG. 4 is a flow chart of a method for controlling an image display apparatus using a remote control according to an exemplary embodiment of the present invention.

FIG. 4 is a flow chart of a method for controlling an image display apparatus using a remote control according to an exemplary embodiment of the present invention. More specifically, a method for controlling a remote control having a plurality of sensors for sensing the movement of the remote control 100 to control an external device is described. Firstly, in operation S410, the first sensor 110-1 from among the plurality of sensors 110-1 to 110-n is turned on to sense the movement of the remote control 100. In operation S420, the movement of the remote control 100 is sensed periodically by transmitting an impulse signal of a short period to the first sensor 110-1. The sensed signal is converted into a digital signal.

The sensors 110-1 to 110-n may be implemented as two-axis or three-axis gyro sensors, two-axis or three-axis acceleration sensors, or as a combination of at least two sensors from among two-axis or three-axis gyro sensors, two-axis or three-axis acceleration sensors, and terrestrial magnetism sensors. The first sensor may preferably be a gyro sensor.

In operation S430, if the first sensor senses the movement of the remote control 100, power is supplied to the remaining sensors 110-2 to 110-n. If the signal level output from the first sensor 110-1 is higher than the reference signal level, it is determined that the remote control 100 moves.

In operation S440, if the plurality of sensors 110-1 to 110-n are all turned on, a counter is set. The counter is set as n seconds, and if the movement of the remote control 100 is not sensed, the counter counts down by 1 second to be n−1 seconds. In operation S450, if the movement of the remote control 100 is not sensed during n seconds and the set counter reaches 0, power is supplied only to the first sensor 110-1, so that the first sensor 110-1 is turned on and the remaining sensors 110-2 to 110-n are turned off. Alternatively, if the movement of the remote control 100 is sensed, the counter is not set.

In operation S460, if the plurality of sensors 110-1 to 110-n output signals regarding the movement of the remote control 100, the output signals are converted into digital signals.

The output signals may be analog signals or digital signals according to the processing method of the sensors 110-1 to 110-n. If the sensors 110-1 to 110-n output digital signals, analog to digital conversion is not needed.

In operation S470, the converted digital signal is converted into a transmittable signal and the transmittable signal is transmitted to the image display apparatus 200. When the digital signal regarding the movement of the remote control 100 is transmitted to the image display apparatus 200, a signal input using buttons on the remote control 100 or an additional signal such as channel information for high frequency transmission thereto may be attached thereto.

Figure 5:
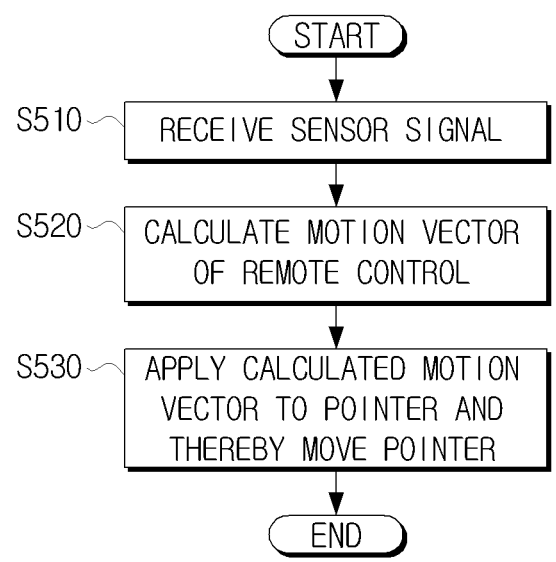
FIG. 5 is a flow chart of a method for controlling a pointer of an image display apparatus according to an exemplary embodiment of the present invention.

FIG. 5 is a flow chart of a method for controlling a pointer of an image display apparatus according to an exemplary embodiment of the present invention. The pointer is provided on the display, and the user can control the setting menus displayed on the display of the image display apparatus 200 using the pointer 240.

In operation S510, the image display apparatus 200 receives a sensor signal corresponding to the movement of the remote control 100 from the remote control 100.

In operation S520, the image display apparatus 200 calculates a motion vector of the remote control 100 using the received sensor signal. That is, movement variances of the remote control 100 on X-axis and Y-axis are calculated by applying the received sensor signal to a pre-stored motion vector calculation algorithm.

Subsequently, in operation S530, the pointer is moved and displayed using the movement variances based on the current coordinates (X, Y) of the pointer.

As can be appreciated from the above description, a remote control determines whether to turn on/off a plurality of sensors mounted in the remote control using one of the sensors, and transmits a signal output from the sensor to an image display apparatus without applying the signal to an algorithm so that battery consumption for sensing the movement of the remote control and applying the signal to the algorithm can be reduced.

The foregoing exemplary embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. An apparatus comprising:
a first movement sensor configured to sense a first movement of the apparatus; and
a second movement sensor configured to sense a second movement of the apparatus,
wherein, when the first movement sensor is powered-on while the second movement sensor is powered-off, the second movement sensor is then subsequently powered-on based on a first signal from the first movement sensor, wherein the first signal is generated in response to the first movement of the apparatus sensed by the first movement sensor,
wherein, when the first movement sensor and the second movement sensor do not detect a movement of the apparatus within a predetermined time period while the first movement sensor and the second movement sensor are powered-on, the second movement sensor is then subsequently powered-off,
wherein at least one of the first movement sensor and the second movement sensor comprises a gyro sensor, and
wherein the apparatus generates a signal for controlling movement of a pointer displayed on a display device based on the first movement sensed by the first movement sensor and the second movement sensed by the second movement sensor, and transmits the generated signal to the display device.

2. The apparatus of claim 1, further comprising:
a controller which is configured to receive the first signal from the first movement sensor while the second movement sensor is powered-off, and is configured to control the second movement sensor to turn-on in response to the first signal from the first movement sensor.

3. The apparatus of claim 1, further comprising:
a data transmission device configured to transmit the generated signal for controlling movement of the pointer, to the display device.

4. A system for controlling a display device by a remote controller, the display device comprising:
a data receiver, configured to receive a signal for controlling movement of a pointer displayed on the display device from the remote controller;
a display screen configured to display a screen including the pointer; and
a pointer position calculator, configured to calculate a position of the pointer in response to the signal from the remote controller,
wherein the signal is generated based on a movement of the remote controller, and
wherein, when a first movement sensor, configured to sense a first movement of the remote control, is powered-on while a second movement sensor is powered-off, the second movement sensor is then subsequently powered-on based on a first signal from the first movement sensor, the first signal is generated in response to the first movement of the apparatus sensed by the first movement sensor,
wherein a controller powers-off the second movement sensor after the powering-on of the second movement sensor, if a signal in response to sensing a second movement of the apparatus is not received from the powered-on second movement sensor within a predetermined period of time, and
wherein when the first movement sensor is powered-on while the second movement sensor is powered-off, the first movement sensor transmits impulse signals at regular intervals to sense movement of the remote control and the second movement sensor does not transmit impulse signals.

5. An apparatus comprising:
a first movement sensor configured to sense a first movement of the apparatus;
a second movement sensor configured to sense a second movement of the apparatus, and
a controller configured to power-off the second movement sensor in a power consumption saving mode,
wherein, when the controller receives a first signal from the first movement sensor in response to sensing the first movement of the apparatus while the second movement sensor is powered-off, the controller is configured to then subsequently power-on the second movement sensor in response to receiving the first signal which is generated in response to the first movement of the apparatus sensed by the first movement sensor,
wherein, when the apparatus maintains a stable state during a predetermined time period while the first movement sensor and the second movement sensor are powered-on, the second movement sensor is then subsequently powered-off,
wherein at least one of the first movement sensor and the second movement sensor comprises a gyro sensor, and
wherein the apparatus generates a signal for controlling movement of a pointer displayed on a display device based on the first movement sensed by the first movement sensor and the second movement sensed by the second movement sensor and transmits the generated signal to the display device.

6. The apparatus of claim 5, wherein:
a data transmitter configured to transmit the generated signal, for controlling movement of the pointer, to the display device.

7. The apparatus of claim 5, wherein:
the second movement sensor is the gyro sensor; and
the first movement sensor is one of an acceleration sensor and a terrestrial magnetism sensor.

8. The apparatus of claim 5, wherein the controller powers-off the second movement sensor after the powering-on of the second movement sensor, if a signal in response to sensing the second movement of the apparatus is not received from the powered-on second movement sensor within a predetermined period of time.

9. An apparatus comprising:
a first movement sensor for sensing a first movement of the apparatus;
a second movement sensor for sensing a second movement of the apparatus and which operates in a first power consumption mode and a second power consumption mode, and
a controller configured to control the second movement sensor,
wherein, if the controller receives a first signal outputted from the first movement sensor in response to sensing the first movement of the apparatus while the second movement sensor is in the first power consumption mode, the first signal is generated in response to the first movement of the apparatus sensed by the first movement sensor, the controller is configured to output a second signal to then subsequently change a power consumption mode of the second movement sensor from the first power consumption mode to the second power consumption mode in response to the first signal,
wherein, when the apparatus maintains a stable state during a predetermined time period while the first movement sensor and the second movement sensor are powered-on, the second movement sensor is then subsequently powered-off,
wherein at least one of the first movement sensor and the second movement sensor comprises a gyro sensor, and
wherein the apparatus generates a signal for controlling movement of a pointer displayed on a display device based on the movement sensed by the first movement sensor and the second movement sensor and transmits the generated signal to the display device.

10. The apparatus of claim 9, further comprising:
a data transmitter configured to transmit the generated signal to the display device.

11. The apparatus of claim 9, wherein:
the second movement sensor is the gyro sensor; and
the first movement sensor is one of an acceleration sensor and a terrestrial magnetism sensor.

12. The apparatus of claim 9, wherein the controller outputs a signal for changing the second movement sensor to the first power consumption mode again, if a signal in response to sensing the movement of the apparatus is not received from the second movement sensor in the second power consumption mode within a predetermined period of time.

13. A system for controlling a display device by a remote controller, the display device comprising:
a data receiver configured to receive a signal for controlling movement of a pointer displayed on the display device from the remote controller;
a display screen configured to display a screen including the pointer; and
a pointer position calculator configured to calculate a position of the pointer in response the signal from the remote controller,
wherein the signal is generated based on a movement of the remote controller, and
wherein, when a first movement sensor, configured to sense a first movement of the remote controller, is powered-on while a second movement sensor is then subsequently powered-on based on a first signal from the first movement sensor, the first signal is generated in response to the first movement of the remote controller sensed by the first movement sensor,
wherein a controller powers-off the second movement sensor after the powering-on of the second movement sensor, if a signal in response to sensing a second movement of the apparatus is not received from the powered-on second movement sensor within a predetermined period of time, and
wherein when the first movement sensor is powered-on while the second movement sensor is powered-off, the first movement sensor transmits impulse signals at regular intervals to sense movement of the remote control and the second movement sensor does not transmit impulse signals.

14. The apparatus of claim 1, wherein the first movement sensor and the second movement sensor are arranged separately.

15. The apparatus of claim 5, wherein the first movement sensor, the second movement sensor and the controller are arranged separately.

16. The apparatus of claim 1, further comprising:
a battery operable to supply power to the first movement sensor and the second movement sensor.

17. The apparatus of claim 5, wherein the stable state is a state that the apparatus does not move.

18. The apparatus of claim 9, wherein the stable state is a state that the apparatus does not move.

19. The apparatus of claim 1, wherein the first movement sensor and the second movement sensor each comprise powered-sensors requiring respective supplies of electrical power to sense movement.

20. The apparatus of claim 1, wherein when the first movement sensor is powered-on while the second movement sensor is powered-off, the first movement sensor transmits impulse signals at regular intervals to sense movement of the remote control and the second movement sensor does not transmit impulse signals.

* * * * *